March 12, 1957    R. W. BROWN    2,785,375
APPARATUS FOR TESTING CONTACTS

Filed May 27, 1953    3 Sheets-Sheet 1

INVENTOR
R. W. BROWN
BY C. B. Hamilton
ATTORNEY

INVENTOR
R. W. BROWN
BY C. B. Hamilton
ATTORNEY

United States Patent Office 2,785,375
Patented Mar. 12, 1957

2,785,375
APPARATUS FOR TESTING CONTACTS

Raymond W. Brown, Evergreen Park, Ill., assignor to Western Electric Company, Incorporated, New York, N. Y., a corporation of New York Application May 27, 1953, Serial No. 357,877

9 Claims. (Cl. 324—28)

This invention relates to methods of and apparatus for testing contacts, and more particularly to methods of and apparatus for testing the operation of a plurality of contacts of a relay.

In the telecommunication arts, multi-contact relays often are used for purposes in which the several contacts of such a relay must be actuated at definite points in the actuating movement of an armature of the relay. In some instances, it is essential that all the contacts be closed simultaneously, while sometimes it is necessary that some close before others or open before others. In the past, there has been no apparatus known which would quickly test the operative relationship of several contacts of a relay one with respect to another, and with respect to the travel of the armature.

An object of the invention is to provide new and improved methods of and apparatus for testing contacts.

Another object of the invention is to provide new and improved methods of and apparatus for testing multi-contact relays.

A further object of the invention is to provide new and improved methods of and apparatus for simultaneously testing and indicating the operative conditions of the several contacts of a multi-contact relay.

In a method and an apparatus illustrating certain features of the invention, a beam of a cathode ray tube is cycled horizontally at a predetermined rate and is intensified at predetermined points in the travel thereof to form a predetermined number of bands equal to the number of sets of contacts of a relay to be tested independently of the positions of the contacts, the sets of contacts are actuated repeatedly and the beam is swept vertically in accordance with the movement of the armature of the relay. The contacts are coupled to the tube so as to change the intensity of the beam as the conditions thereof are changed so that the screen indicates the relative points at which the sets of contacts change conditions.

In a method and an apparatus forming more specific embodiments of the invention, sets of contacts of a relay are periodically actuated and deactuated by an armature of the relay. As the relay contacts are actuated, transducer means responsive to the movement of the armature of the relay is utilized to cause a vertical sweep of a beam of a cathode ray tube, which is rapidly cycled horizontally by a ring counter. All the contacts of the relay are sequentially connected to the tube during each horizontal movement of the beam so that a vertical band is formed for each set of contacts, and the contacts apply a beam-intensifying potential to the beam-forming element while closed so that the portion of each vertical band concurrent with a closed position of the set of contacts is brighter than the portion thereof concurrent with an open position of that set of contacts.

A complete understanding of the invention may be obtained from the following detailed description of a method and an apparatus forming specific embodiments thereof, when read in conjunction with the appended drawings, in which.

Figure 1:
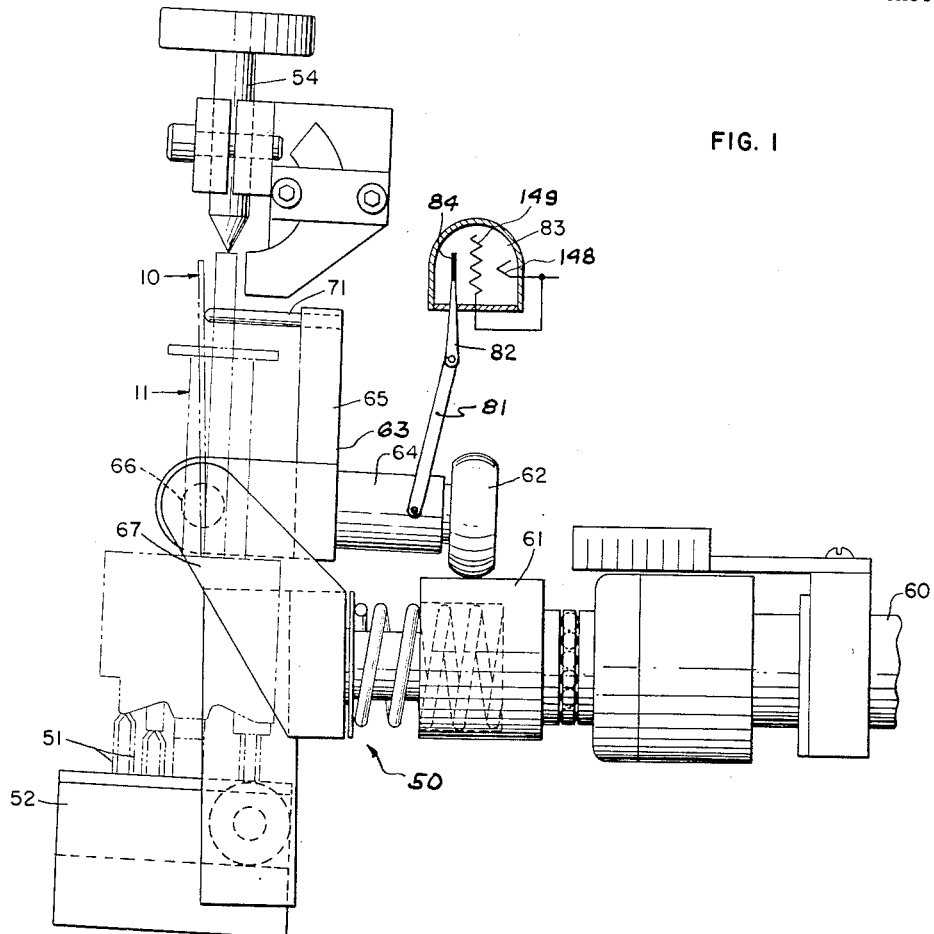
Fig. 1 is a side elevation of a portion of an apparatus for practicing a method forming one embodiment of the invention.
Figure 2:
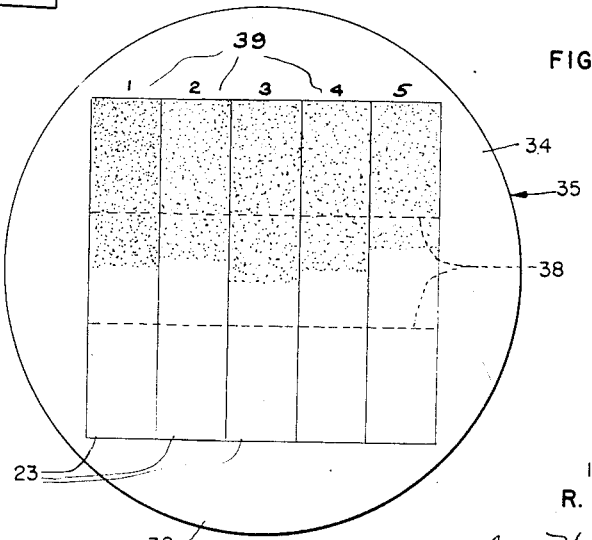
Fig. 2 is a front elevation of another portion of the apparatus.

Referring now in detail to the drawings, there is shown therein an apparatus for measuring the points during the movement of an armature 10 of a relay 11 (Fig. 3) at which each of sets of contacts 13 is moved between an open position to a closed position, and for comparing the relative points in the armature movement at which the several sets of contacts are closed. The apparatus forms a plurality of vertical bands 23 separated by faint, darker lines, one band for each set of contacts, on a fluorescent screen 34 of a cathode ray tube 35 (Fig. 3) of the type widely used in television receivers, each band being of a predetermined, intermediate intensity while the set of contacts associated therewith is open, and being of a much brighter intensity coextensive with the portion of this movement of the contacts in which the set of contacts is closed. Limit lines 38—38 are provided on the screen 34 to indicate whether or not the sets of contacts are closing within allowable limits, and indicia 39 is formed on the screen 34 to indicate which set of contacts each band 23 corresponds to.

The relay 11 is placed in a holding and connecting fixture 50 (Fig. 1) with connectors 51 thereof being inserted into sockets in a connector block 52, and a thumb screw 54 is actuated to clamp the relay frame securely to the connector block 52 in a definite position thereon. A shaft 60 driven by a motor (not shown) at a predetermined rate of speed, such as, for example, 900 revolutions per minute, rotates a cam 61 therewith, which swings a cam follower 62 and a lever 63 having arms 64 and 65. The lever 63 is pivotally mounted on a pin 66 supported by a fixed bracket 67, and carries pins 71 which engage the armature 10 of the relay. As the cam 61 is rotated, it oscillates the lever 63 against the action of the relay at a rate such that the pins 71 move the armature 10 in a non-actuating direction and permit the armature 10 to be returned to its actuated position slowly and at a fairly uniform rate by a winding 72 of the relay 11, which is continuously energized by a battery 74 (Fig. 3).

Simultaneously with this actuation of the relay contacts, the lever 63 actuates a link 81 fastened to an actuator 82 of a transducer tube 83 of a well known type. As the actuator 82 of the transducer tube is moved while the cam 61 moves the armature in a non-actuating direction, it moves a plate 84 of the transducer tube so as to increase the impedance of the tube 83 in proportion to the movement of the armature 10 of the relay 11. Each set of contacts 13 is connected to cathodes 91 of vacuum tubes 93 on one side, and to a conductor 105 connected to an intensity controlling grid 106 of the tube 35 on the other side. Anodes 104 of the tubes 93 are connected to the positive side of a D. C. current source 108 by a conductor 107. The current source 108 applies such a voltage to the anodes 104 that each time one of the sets of contacts is closed and a grid 109 of the tube 93 is made less negative in effect to the cathode thereof, that tube 93 is made more conductive. This raises the potential of the cathode 91, which raises the potential of the grid 106 of the tube 35, whereby the beam from the cathode 111 of the tube 35 is intensified.

Figure 3:
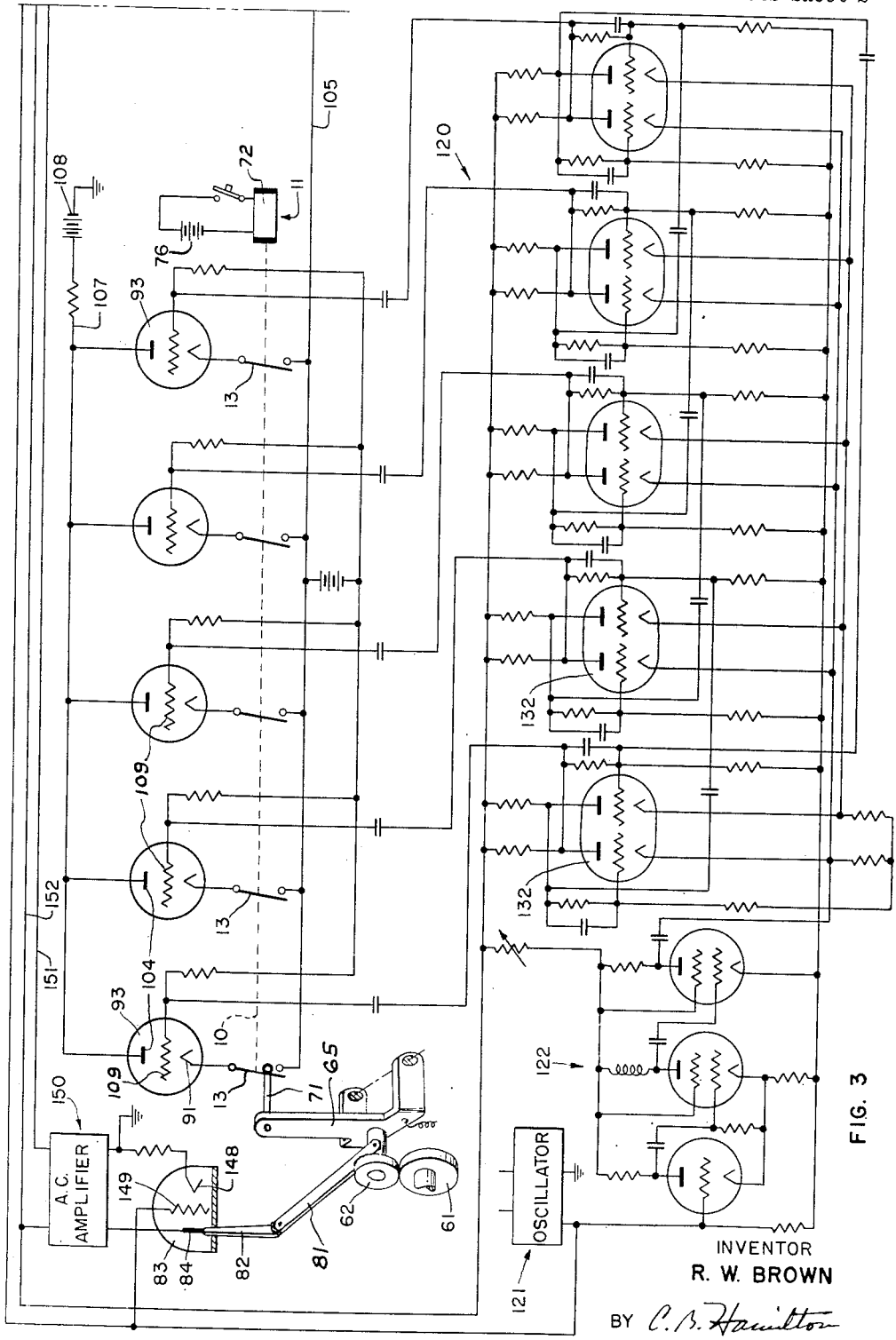
Fig. 3 is a schematic view of a portion of a circuit associated with the apparatus shown in Fig. 1.
Figure 4:
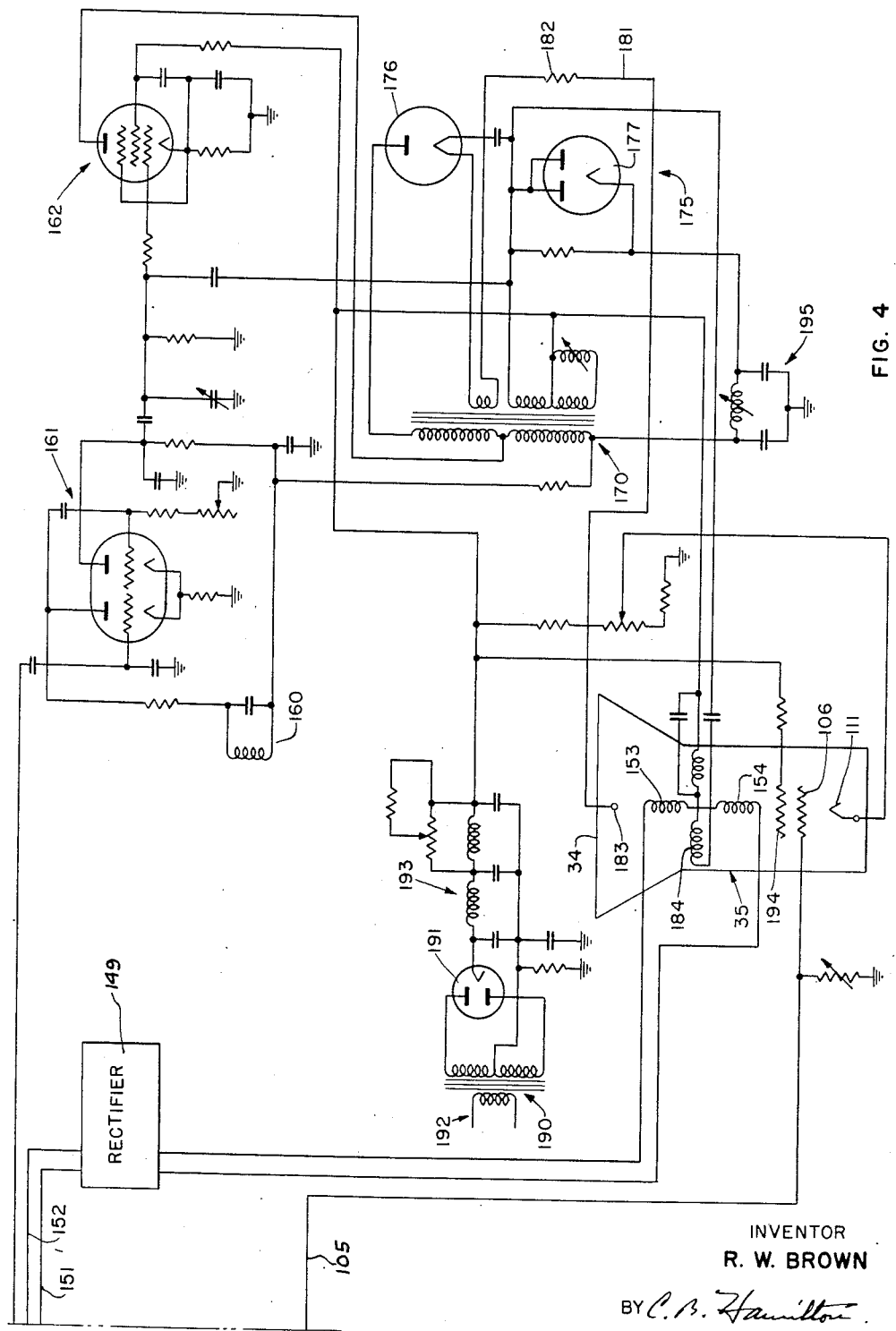
Fig. 4 is a schematic view of the remainder of the circuit being designed to join the portion of the circuit shown in Fig. 3 at the lefthand edge of the latter portion.

A ring counter 120 (Fig. 3) of a well known type is supplied with power from an oscillator 121 having a frequency of known quantity, say, for example, 150 kilocycles per second, through a pulse-shaping circuit 122 operating in such a manner that on successive pulses of the oscillator 121, successive ones of tubes 132 of the ring counter circuit are made conductive, starting with the lefthand tube 132, as viewed in Fig. 3, through the intermediate tubes to the righthand tube 132 and then back to the lefthand tube 132. A ring counter of any suitable type may be used for the ring counter 120, which is substantially identical in construction and operation with the ring counter disclosed in the article "Hi-speed N-Scale Counters" by T. K. Sharpless and shown in Fig. 4 thereof on page 125 of the March 1948, issue of "Electronics." As each of the tubes 132 is made conductive, it raises the grid potential of the tube 93 associated therewith to make that tube 93 conductive if the set of contacts 13 connected thereto are closed. Thus, each tube 93, proceeding from left to right, as viewed in Fig. 3 is sequentially connected to the intensity controlling grid 106 of the cathode ray tube 35. While each of the contacts 13 is open, it makes the tube 93 associated therewith nonconductive to decrease the intensity of the beam of the cathode ray tube 35 so that it forms a less bright spot on the screen 34 in the line corresponding to that set of contacts.

Alternating current from the oscillator 121 is supplied to a grid 149 of the transducer tube 83, the plate 84 of which is actuated by the cam 61 in synchronism with the actuation of the contacts 13 of the relay 11, and the output thereof is transmitted to an A. C. amplifier 150 of commercial design, which applies potential to the plate 84 and a cathode 148 of the transducer 83. The grid 149 causes an A. C. current to flow through the transducer 83 to the amplifier 150 continuously, and the amplitude of this current is increased as the plate is moved toward the cathode. The amplifier 150 amplifies the A. C. current supplied thereto by the transducer, and transmits the amplified alternating current signal through conductors 151 and 152 to a rectifier 149 connected to vertical deflection coils 153 and 154 of the tube 35. Thus, as each set of contacts of the relay is slowly actuated, the vertical deflection coils 153 and 154 sweep the beam of the tube 35 vertically, and when each set of contacts closed, the beam is at a level on the screen 34 corresponding to that point in the movement of the contacts.

An oscillator network 160 of a predetermined frequency associated with a horizontal sweep oscillator 161 of standard design is coupled to the oscillator 121 so that the oscillator 161 is locked in step with the oscillator 121, and is chosen to have a natural frequency of such a ratio with respect to that of the oscillator 121 that the beam is swept in horizontal steps completely across the screen 34, is darkened, and is brought back to the lefthand edge of the screen for each complete cycle of the ring counter circuit 120. The output of the oscillator 161 is coupled to a conventional amplifying circuit 162 supplying a step-up transformer 170 with the output thereof. The transformer 170 actuates a standard horizontal deflecting circuit 175 including a rectifying tube 176 and a horizontal damping tube 177, the output of which is connected by a conductor 181 and a resistance 182 to an anode 183 of the tube 35. Horizontal deflecting coils 184 actuated by the tube 176 and the damper 177 horizontally deflect the beam at a frequency such that lines spaced close together vertically are formed on the screen as the transducer deflects the beam vertically, the beam being visible on the screen 34 while moving in one direction across the screen and being darkened by the damping as it is rapidly returned in the other direction across the screen. The beam moves horizontally across the screen 34 once during each cycle of the ring counter so that there is one band formed on the tube for each set of contacts, there being faint, darker lines formed between the bands from the impedance change as the ring counter moves from one set of contacts to the next. A transformer 190 and a rectifier 191 supply A. C. current from a powerline 192 to a conventional focus control circuit 193 connected to a grid 194 of the tube 35. The circuit 175 also is provided with a conventional network 195, which provides horizontal linearity.

*Operation*

The cam 61 through the armature 10 repeatedly opens the sets of contacts 13 rapidly and permits them to close at a rate of speed much more slowly than the contacts are opened, and also actuates the transducer tube 83 during each closing movement of the contacts to increase the flow of current through the transducer tube 83 proportionally to the extent of movement of the armature and the sets of contacts. The transducer tube 83 sweeps the beam of the tube 35 vertically in the direction from top to bottom as the contacts are permitted to move toward their fully actuated positions by the cam 61. During each revolution of the cam 61, the ring counter circuit 120 is actuated by the oscillator 121 to repeatedly connect each set of the contacts 13 to the grid 106. As the cam 61 is rotated, the horizontal sweep oscillator 161 sweeps the beam horizontally across the screen 34, darkens the beam, returns it, brightens it and sweeps it again across the screen. During each sweep of the beam horizontally across the screen, each tube 93 is made conductive once by the ring counter circuit 120 while the beam is forming the band 23 corresponding thereto, but no current flows through the tube until the set of relay contacts connected thereto is closed.

As each set of the sets of contacts 13 is closed, an increased potential is applied to the intensity control grid 106 so that the intensity of the beam is increased at that instant. Thus, merely by observing the screen of the cathode ray tube and noting where the brighter portion of each band starts, the point in the movement of the armature 10 at which each set of the relay contacts is actuated is evident.

The above-described method and apparatus accurately and rapidly tests a plurality of contacts, and is inexpensive both in construction and operation. While the testing of only normally open or "normal make" contacts is described hereinabove, it is obvious that "early make," "early break" and "normal break" contacts can be tested.

Certain features of the above-described method and apparatus are disclosed and claimed in copending application Serial No. 357,875, filed May 27, 1953, by R. W. Brown for "Methods of and Apparatus for Testing Contacts."

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for testing contacts, which comprises means for actuating periodically a plurality of sets of contacts of a relay, a cathode ray tube having a beam-forming element and a beam-intensifying element, means for periodically sweeping the beam of the tube in one direction, means for deflecting the beam in a direction perpendicular to said direction in accordance with the extent of actuation of the sets of contacts, a D. C. voltage source, and means for applying a predetermined voltage from the voltage source through the sets of contacts one after another to the beam-intensifying element for each sweep of the beam in said first-mentioned direction, whereby the intensity of the beam is changed as each set of contacts is changed between an open position and closed position.

2. An apparatus for testing contacts, which comprises a cathode ray tube having a beam-forming element and a beam-intensifying element, means for actuating the beam-forming element continuously, means for cyclically deflecting the beam horizontally, means for actuating sets of contacts of a relay, means for connecting the cathode ray tube to the ring counter, potential-changing means connected by the sets of contacts one after another to the beam-intensifying element of the tube repeatedly in synchronism with the deflecting means, and transducer means operable in synchronism with the actuating means for deflecting the beam of the tube vertically in accordance with the extent of operation of the actuating means.

3. An apparatus for testing contacts, which comprises a cathode ray tube having a screen, a beam-forming element and a beam-intensifying element, means for periodically deflecting a beam of the tube horizontally across the screen, means for repeatedly actuating a plurality of sets of contacts of a relay to be tested, a D. C. voltage source, ring counter means for connecting the voltage source and the sets of contacts one at a time to the beam-intensifying element once for each horizontal sweep of the beam to form horizontally spaced, bright lines on the screen, one for each set of contacts, a transducer operable by the actuating means, and means operable by the transducer for sweeping the beam of the tube vertically proportionally to the degree of actuation of the transducer means.

4. A testing apparatus, which comprises a cathode ray tube having a beam-forming element, a screen, vertical deflector elements, horizontal deflector elements and a beam-intensifying element, means for energizing the beam-forming element, means for holding a relay having a plurality of sets of contacts, cam means for repeatedly actuating the contacts slowly and returning the contacts rapidly, transducer means responsive to movement of the contacts for actuating the vertical deflector elements to sweep the beam of the tube vertically in proportion to the actuation of the contacts as the contacts are actuated, a D. C. voltage source, a ring counter circuit for connecting the voltage source and the sets of contacts one at a time to the beam-intensifying element, oscillator means for repeatedly cycling the ring counter circuit, and means for actuating the horizontal deflector elements in such a manner that the beam is swept horizontally across the screen once for each cycle of the ring counter circuit.

5. An apparatus for testing relay contacts, which comprises means for repeatedly actuating a plurality of sets of contacts of a relay and returning the contacts to non-actuated positions in such a manner that the period of time in which the contacts are being actuated is substantially higher than the period of time in which the contacts are returned, a cathode ray tube having a beam-forming element, vertical deflecting elements and horizontal deflecting elements, means for energizing the beam-forming element, means for actuating the horizontal deflecting element to sweep the beam of the cathode ray tube horizontally as the sets of contacts are being actuated once, transducer means operable by the contact-actuating means for actuating the vertical deflecting elements to sweep the beam vertically in proportion to the amount of actuating movement of the sets of contacts, a D. C. voltage source, and means including a ring counter for intensifying the beam with each set of contacts one after another and the voltage source once for each horizontal sweep of the beam.

6. An apparatus for testing contacts, which comprises means for periodically actuating a relay having a plurality of sets of contacts to move the contacts from normal conditions thereof to actuated conditions thereof, a fluorescent screen, a cathode ray tube having a beam-forming element, vertical deflecting elements, horizontal deflecting elements and a beam-intensifying element, said screen having limit lines thereon, transducer means responsive to the actuating means for actuating the vertical deflecting elements to sweep the beam of the tube in accordance with the extent of movement of the contacts, a D. C. voltage source, cyclic electronic means for repeatedly coupling the sets of contacts one after another and the voltage source to the beam-intensifying element, and means for actuating the horizontal-deflecting elements in such a manner that the beam is swept horizontally across the screen once for each cycle of the cyclic electronic means.

7. A testing apparatus, which comprises a cathode ray tube having a beam-forming electrode, a screen, vertical deflecting coils, horizontal deflecting coils and a beam-intensifying electrode means for actuating the beam-forming electrode, oscillating means for actuating the horizontal deflecting coils to sweep the beam in steps horizontally at a predetermined frequency, means for holding a relay having a plurality of sets of contacts, means for actuating the relay, transducer means responsive to the extent of movement of the contacts for actuating the vertical coils to sweep the beam vertically as the contacts are actuated, a D. C. voltage source, a ring counter circuit for coupling the sets of contacts one after another and the voltage source to the beam-intensifying element, and oscillating means for cycling the ring counter circuit once for each horizontal sweep of the beam.

8. An apparatus for indicating simultaneously a plurality of characteristics, which comprises means for creating a signal voltage periodically for each characteristic, a cathode ray tube having a beam-forming element and a beam-intensifying element, means for periodically sweeping the beam of the tube in one direction, means for deflecting the beam in a direction perpendicular to said direction in accordance with the creation of the signal voltages, means for coupling the signal voltage sources seriatim to the beam-intensifying element for each sweep of the beam in said first-mentioned direction whereby the intensity of the beam is changed as each signal voltage varies.

9. An apparatus for indicating a plurality of characteristics simultaneously, which comprises a cathode ray tube having a screen, a beam-forming element and a beam-intensifying element, means for periodically deflecting a beam of the tube horizontally across the screen, a plurality of signal circuits, means for repeatedly creating a signal voltage in each signal circuit corresponding to one characteristic, a voltage source, ring counter means for connecting the voltage source and the signal circuits one at a time to the beam-intensifying element once for each horizontal sweep of the beam to form horizontally spaced, bright lines on the screen, one for each characteristic, and means operable by the signal-voltage-creating means for sweeping the beam of the tube vertically.

References Cited in the file of this patent
UNITED STATES PATENTS

| | | |
|---|---|---|
| 2,171,216 | Koch | Aug. 29, 1939 |
| 2,432,944 | Shillington | Dec. 16, 1947 |